United States Patent [19]

Johnson

[11] 4,189,514
[45] Feb. 19, 1980

[54] PROCESS OF MAKING HIGH-TEMPERATURE MAGNETIC TAPE

[75] Inventor: Robert A. Johnson, Graham, Tex.

[73] Assignee: Graham Magnetics, Inc., Ft. Worth, Tex.

[21] Appl. No.: 887,545

[22] Filed: Mar. 17, 1978

[51] Int. Cl.² ............................................. H01F 10/02
[52] U.S. Cl. .................................... 428/331; 360/134;
428/411; 428/447; 428/538; 428/900; 428/906; 428/922; 428/425.9; 427/128; 427/131
[58] Field of Search .............. 428/539, 900, 906, 922, 428/331, 425, 447, 411, 538; 360/134; 427/131, 128

[56] References Cited

U.S. PATENT DOCUMENTS

| 2,921,869 | 1/1960 | McBride | 428/331 |
| 2,976,184 | 3/1961 | Blatz | 428/331 |
| 3,293,066 | 12/1966 | Haines | 428/922 |
| 3,476,595 | 11/1969 | Nacci | 428/539 |
| 3,881,046 | 4/1975 | Akashi | 428/900 |
| 3,911,196 | 10/1975 | Navidad | 428/900 |
| 3,931,428 | 1/1976 | Reich | 428/331 |
| 3,941,911 | 3/1976 | Newton | 428/539 |
| 3,993,824 | 11/1976 | Shirahata | 428/900 |
| 3,995,089 | 11/1976 | Hartmann | 428/900 |
| 4,020,227 | 4/1976 | Deffeyes | 428/900 |

OTHER PUBLICATIONS

"Handbook of Tradenames", Zimmerman and Lavine, p. 41, Ind. Research Service Inc., 1957, Dover, N.H.

*Primary Examiner*—Ellis P. Robinson
*Attorney, Agent, or Firm*—Robert A. Cesari; John F. McKenna; Andrew F. Kehoe

[57] ABSTRACT

An improved, conventionally-spoolable, magnetic tape which can be unspooled and read after exposure to very high temperatures. The improvement is largely in a thermally resistant, non-adhering, anti-static backing system, used in conjunction with magnetic face coatings.

6 Claims, 2 Drawing Figures

PROCESS OF MAKING HIGH-TEMPERATURE MAGNETIC TAPE

BACKGROUND OF THE INVENTION

This application relates to magnetic tape which can be encoded, wound, and subsequently unwound and read from conventional helical spools after exposure at elevated temperatures, e.g. temperatures of from 400° F. to 500° F.

U.S. Pat. No. 3,941,911 to Newton describes e.g., a tape wherein a polymerized polyesterurethane-based magnetic coating is used in conjunction with a polyetherurethane-based backing to achieve what is believed to be the only commercially successful, spoolable, magnetic tape of the prior art which used an organic resin matrix binder for ferromagnetic particles and could withstand high temperatures.

This invention relates to an improvement in the art relating to such high-temperature tapes as disclosed in U.S. Pat. No. 3,941,911. However, whereas the operability of the tape disclosed in that patent was predicated upon assuring a chemical distinction between the matrix for the ferromagnetic facing coating and the matrix for the anti-static carbon black-containing backing coating, the invention described below focuses on a novel, anti-static backing composition which is universally acceptable for use with high-temperature magnetic coatings.

Use of prepolymerized polyesterurethane matrices for ferromagnetic coatings on tape is old in the art. However, most such coatings have been so loaded with lubricants and other plasticizing ingredients that they have little, if any, value in construction of helically spoolable high temperature magnetic tape, except as described in the aforesaid Newton patent. On the other hand, some formulae, and especially the crosslinked formulae disclosed in U.S. Pat. No. 4,020,227 to Deffeyes, do disclose resin binder formulations which, properly cured, have good high temperature properties and may be utilized as high temperature magnetic coatings. More particularly, they can be utilized in helically spooled form when utilized according to the teachings of the invention described below.

In a review of art related to the invention, it is also noted that the use of silicone oil as a lubricant in magnetic tapes is known. It is noted in this connection that this statement of prior art is necessarily prepared in hindsight and nothing herein is to be construed as indicating that there was any basis for assembling this art except in hindsight and with the present invention in mind.

SUMMARY OF THE INVENTION

It is a principle object of the invention to provide a novel, helically spoolable, magnetic tape for use in high-temperature environments.

Another object of the invention is to provide a more facile method for making such a magnetic tape.

A further object of the invention is to improve the adhesion of coatings to tape substrates.

Another object of the invention is to provide a novel and improved anti-static coating for use with magnetic tape.

Other objects of the invention will be obvious to those skilled in the art on reading this disclosure.

The above objects have been achieved as a consequence of the discovery that a magnetic tape, of the type using a heat-resistant magnetic layer, can be rendered into a dependable, spoolable, magnetic tape having utility at very high temperatures when it is backed with a conductive, anti-static coating which is based on pre-polymerized polyurethane. The backing coating is carefully formulated to provide a hard, tough coating with excellent adhesion to the substrate, also to provide suitable release properties with respect to the coating in which it is in back-to-face relationship in a helically-spooled reel of tape. Prepolymerized polyesterurethane-based matrices are preferable for use on both sides of the tape.

Polyesterurethane-based resin binder for the anti-static backing coat is desirably formulated with minor quantities of linear polyhydroxy ethers and isocyanate cross-linking resin. Such binders are generally known to the art, but heretofore have not been generally useful in manufacture of high-temperature tapes which are capable of being unwound and read after being exposed to high temperatures, e.g. temperatures of 400° F. for an hour or temperatures of abut 500° F. for half an hour. As described in U.S. Pat. No. 3,941,911 to Newton, such binders could be used in conjunction with a polyesterurethane binder, but even in such use, yields were very low, unless precautions to protect the ingredients of a polyesterurethane component from moisture were carefully maintained.

Applicant has found that favorable release properties may be achieved by using controlled quantities of a silicone-oil based lubricant such as that sold under the trade designation FS-1147 by General Electric Company. Control of the lubricant distribution and hardness of the finished formulation is favorably affected by the addition of a high-structured filler, e.g. a pyrogenic silica to the binder system.

While Applicant does not wish to be bound by any particular theory of the invention, it is believed that the success of the invention is assignable to a number of factors. First, the use of a silicone-oil based lubricant is of particular value. Secondly, in achieving effectiveness of the lubricant while simultaneously avoiding excessive bloom thereof from the body of the anti-static backing coating, the use of a pyrogenic silica filler is desirable. The filler tends to absorb excessive lubricant, and the initial distribution throughout the mix and, after the coating is completed, diminish and even meter any migration of the silicone-oil to the surface of the coating. Moreover, as noted above, the silica tends to contribute a hardness to the resin. This increased hardness appears to be a function, not only of the silica itself, but its coaction with other powder fillers, such as carbon black, and the resin matrix to improve the spatial distribution of all fillers within the matrix.

These two adjuvants modify the heat-responsive adhesive qualities of the binder system so that there is minimal interaction with conventional high-temperature magnetic tape encoding compositions of the type already known to be resistant to heat, albeit not heretofore useful as helically spooled tape except as may be taught in U.S. Pat. No. 3,941,911.

In addition, Applicant has found that a use of an *adhesion-promoting* solvent, e.g. dimethyl formamide (DMF), if used in conjunction with the conventionally utilized vehicles like tetrahydrofuran (THF) can promote improved adhesion between tape and the commonly used substrate. A biaxially oriented polyimide material sold under the trade designation Kapton by DuPont is an entirely acceptable substrate for high-temperature magnetic tape applications.

Use of only a minor quantity of a solvent having an ability to promote the adhesion of the polyurethane-based coatings to the polymeric substrate is required. It is best if both coatings are applied using small quantities, say about 0.5 lbs. of the solvent per 10 lbs. of the balance of the coating formulations. Increased adhesion gives a further margin of safety in assuring that no delamination will take place on unreeling the tape after it has been exposed to high temperatures.

Although dimethyl formamide is particularly useful, it is to be understood that other solvents may be utilized to achieve a similar functional effect. It is suggested that the teachings of Hansen are helpful in making such a selection. See "The Three Dimensional Solubility Parameter—Key to Paint Component Affinities" (Volume 39, *Journal of Paint Technology*, February 1967, Pages 104–167.

It is also to be emphasized that the aforesaid benefits attributable to the use of pyrogenic silica and silicone-oil based lubricant are particularly useful with those pre-polymerized polyurethane systems wherein a small quantity of phenoxy resin is used to improve the hardness of the resin binder without marked interference with the toughness thereof.

Among the linear polyhydroxy ehters which may be used is that sold by Union Carbide Corp. under the trade designation PKHH or Shell Chemical trade desigantion Eponol 55-B-40. Such resins are found by reacting bisphenol with epichlorohydrin and have a basic chemical structure similar to epoxy resins but are tougher than conventional epoxies because of relatively high, e.g. 30,000, molecular weight, and a lack of highly reactive epoxy groups.

The general structure of such a phenoxy molecule is typified as:

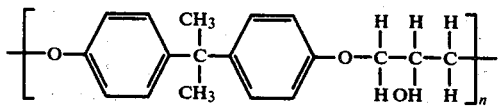

where n is generally required from about 80 to 120.

Crosslinking of the polymer component of the binders is carried out by use of such crosslinking agents as the polymeric isocyanate products commonly known to the art and sold under such trade designations as Mondur CB-75 (by Mobay Chemical Co.) and as Spenkel P49-75S and Spenkel P49-60XC (by Spencer-Kellogg Division of Textron) and as RC-829 (by DuPont). These materials are polyurethane type prepolymers with terminal isocyanate functionalities. These materials readily react to crosslink hydroxyl-bearing polymers. They contain about 12 to 22% by weight of terminal NCO groups based on the weight of polymeric crosslinking agents. They should be low in residual diisocyanate, preferably containing less than 2% of such material.

This crosslinking reaction of the isocyanate and active hydrogen on the polyurethane and hydroxyl groups of polyesters and polyol materals, is catalyzed by such known catalysts as ferric acetyl acetonate, stannous octoate, and the like.

In making the coatings of the invention, the resins are dissolved in a suitable solvent, e.g. those having a moderate hydrogen bonding capacity such as methyl ethyl ketone, tetrahydrofuran, dimethylformamide and the like. The resulting slurry is milled or otherwise treated to disperse the pigment therein.

It is to be understood that various substituents can be utilized for the most advantageous ingredients of the tape coatings of the invention. However, a particular advantage of the present invention is that it works so well with the preferred ingredients that there is little reason to seek functionally inferior ingredients or more expensive substituents. Thus, for example, liquid phase lubricants other than silicone-oil could be utilized. However, an advantage of the invention is that the highly-incompatible and effective lubricant can be utilized in small, yet effective, quantities and without excessive migration, because of the use of a particulate material like fume silica which serves to distribute the silicone oil and other liquid lubricants, and avoid excessive "blooming" or migration thereof.

Likewise, the silica particulate, lubricant-anchoring means can be replaced with an effective quantity of pyrogenic alumina. However, the material is more expensive and is less effective as a means to distribute the particulate fillers within the coating mass. The hardening and lubricant-moderating silica is conveniently one of about a 200 B.E.T. surface area and a 2.3 bulk density. Powders of higher surface area and higher density can be used; however, such powders are relatively hard to disperse and are not generally acceptable.

Finally, other binder systems may be used in making the tape of the invention. For example, polyether-polyurethanes, under rigidly controlled conditions can be cured to form acceptable anti-static backings according to the instant invention.

It also should be understood that, although the major value of the invention is in facilitating the manufacture of spoolable, high-temperature magnetic tapes in excellent yields, the technology can be used in floppy disks, cards, or any other application wherein face-to-back contact of magnetic media is encountered during storage or use. The prepolymerized polyurethane binders used will be those that comprise at least 50% prepolymerized polyester binder. About 5 to 15% of phenoxy resin is advantageously used in the organic binder of the anti-static coating. The anti-static coating of the invention comprises 10 to 30% by weight of pyrogenic silica and 0.5 to 3% silicone oil, preferably 0.5 to 2% of silicone oil.

ILLUSTRATIVE EXAMPLE OF THE INVENTION

In this application and accompanying drawings there is shown and described a preferred embodiment of the invention and suggested various alternatives and modifications thereof, but it is to be understood that these are not intended to be exhaustive and that other changes and modifications can be made within the scope of the invention. These suggestions herein are selected and included for purposes of illustration in order that others skilled in the art will more fully understand the invention and the principles thereof and will be able to modify it and embody it in a variety of forms, each as maybe best suited in the condition of a particular case.

Figure 1:
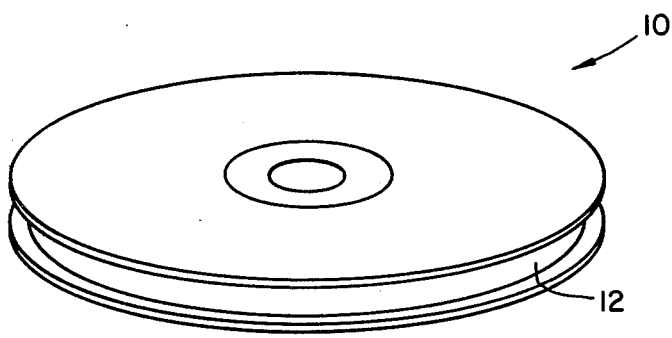
FIG. 1 is a perspective view of a spool of magnetic tape according to the invention.

FIG. 1 illustrates a spool 10 of magnetic tape 12 wherein the tape 12 is wound on conventional helical form so that one side of the ribbon-shaped tape is in contact with the other side thereof.

Figure 2:
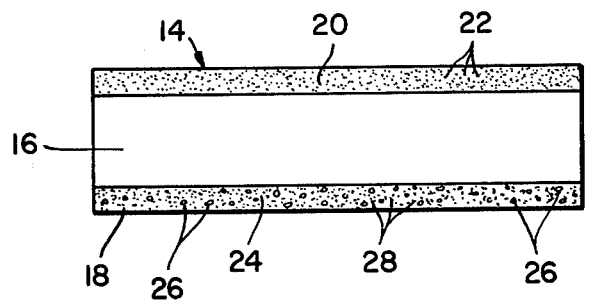
FIG. 2 is a schematic cross-section of a tape prepared according to the invention.

FIG. 2 illustrates, schematically, the tape 12 comprising a magnetic face coating 14, a heat-resistant, e.g. polyimide, substrate 16 and an anti-static or anti-blocking coating 18 on the opposite side of the substrate. Coating 14 is comprised of a cross linked polyesterpolyurethane binder 20 and magnetic particles such as iron oxide 22. Coating 18 is comprises of a cross-linked polyesterpolyurethane binder 24, carbon black particles 26, and pyrogenic silica particles 28.

EXAMPLE 1

A conventional, pre-polymerized polyurethane coating, of the type comprising a quantity of magnetic recording pigment, is prepared, as taught in U.S. Pat. No. 3,941,911 to Newton, and applied to the facing of a polyimide substrate (of the type sold under the trade designation Kapton by DuPont). One modification in the procedure taught by Newton is after the coating is prepared, the addition of a quantity of 0.5 lbs. of DMF is added to each 10 lbs. of the coating mix before the coating is actually carried out. Coating weight is 150 microinches.

When the coating is dried and cured, a second and anti-static coating is prepared for the backing side of the polyester substrate from the following ingredients:

|  | Weight |
|---|---|
| Conductive Carbon Black | 29.85 |
| (sold by Cabot Corp. under the trademark XC-72P) | |
| Pyrogenic Silica | 9.95 |
| (sold by Cabot Corp. under the trademark CA8-O-SIL) | |
| (Soya lecithin) | 0.995 |
| Surfactant | 0.498 |
| (sold by Union Carbide under the trade designation Aerosol OT) | |
| Prepolymerized polyurethane | 47.96 |
| (sold by Goodrich Chemicals under the trade designation Estane 5707) | |
| Phenoxy Resin | 3.98 |
| (sold by Union Carbide under the trade designation PKHH) | |
| Lubricant, Butoxy Ethyl Sterate | 4.98 |
| Silicone-based lubricant | 0.995 |
| (sold by General Electric under the trade designation FS-1147 | |
| Fungicide | 0.1 |
| Isocyanate resin | 4.98 |
| (sold by Mobay Chemical under the trade designation CB-75) | |
| Ferriacetyl Acetonate Catalyst | 0.2 |
|  | 100.00% |

Conventional compounding procedures are used and a dry coating thickness of 90 microinches is applied to the reverse side of the substrate. Again, one exception to the conventional compounding procedure is the addition of 0.5 lbs. of dimethyl formamide solvent to each 10 lbs. of the coating compostion before application to the substrate. After thorough curing the tapes are slit and spooled using the conventional techniques.

The spooled tape, when encoded with magnetic information and subjected to a 400° F. hot air environment for one hour, or 500° F. environment for two hours, retained their ability to be unreeled and read without any substantial loss of magnetic signal.

EXAMPLE 2

The tape of Example 1 is manufactured without use of dimethyl formamide. The adhesion of the coatings to the substrates are somewhat reduced, but otherwise excellent high temperature performance is achievable.

It is also to be understood that the following claims are intended to cover all of the generic and specific features of the invention herein described and all statements of the scope of the invention which might be said to fall therebetween.

What is claimed is:

1. In a helically-spoolable magnetic tape comprising a substrate, a magnetic recording medium of the type comprising magnetic particles in an organic resin matrix on one face of the said substrate, and anti-static coating on the reverse side of said substrate, the improvement wherein said anti-static coating is formed with a thoroughly crosslinked organic resin binder system containing at least 50% prepolymerized polyester-type polyurethane, and comprising dispersed within said binder an effective quantity of a conductive filler from about 10 to 30% by weight of pyrogenic silica and from about 0.5 to about 3% of a silicone-oil based lubricant such weights based on the weight of organic resin binder, said anti-static coating forming an interface with said magnetic recording medium, said interface providing a means to allow unspooling of the spooled tape without any substantial damage thereto after exposure of the tape to elevated temperature.

2. A magnetic tape as defined in claim 1 wherein the resin component of said organic binder in said anti-static coating comprises about 5 to 15% of phenoxy resin.

3. In a magnetic tape of the type comprising a substrate, an anti-static backing coat, and a face coat comprising ferromagnetic particles in an prepolymerized polyesterurethane resin coating, the improvement wherein said anti-static backing comprises, in addition to a pre-polymerized polyurethane based binder system and a primary filler forming means to dissipate static electricity, (1) a silicone-oil based lubricant and (2) an effective quantity of pyrogenic silica forming means to absorb any excessive lubricant and limit the migration thereof to the surface of said coating said anti-static backing coat forming an interface with said face coat, said interface providing means to allow release of said backing coat from said face coat after exposure to elevated temperatures.

4. A magnetic tape as defined in claim 3 wherein said primary filler is a carbon black and said pyrogenic silica forms means to aid spatial distribution of said carbon black within said anti-static coating.

5. A magnetic tape as defined in claim 1 wherein said tape is characterized by resistance to high temperature degradation, remains unwindable and readable after subjection, in spooled form, to an environment of 400° F. for one hour.

6. A magnetic tape as defined in claim 3 wherein said tape is characterized by resistance to high temperature degradation, remains unwindable and magnetically readable after being subject, in spooled form, to an environment of 400° F. for one hour.

* * * * *